INVENTOR.
WINFIELD W. SALISBURY
BY John J. Rogan
ATTORNEY

Patented May 23, 1950

2,509,045

UNITED STATES PATENT OFFICE 2,509,045

ULTRA HIGH FREQUENCY RADIATION INDICATING SYSTEM

Winfield W. Salisbury, Cedar Rapids, Iowa, assignor to Collins Radio Company, Cedar Rapids, Iowa, a corporation of Iowa Application November 26, 1947, Serial No. 788,289

5 Claims. (Cl. 250—1)

This invention relates to radiation indicating or measuring apparatus, and more particularly it relates to methods and means for visually indicating the radiation pattern from a radiating source of the ultra-high-frequency or micro-wave type.

A principal object of the invention is to provide an improved arrangement for producing a visual indication of the radiation pattern and radiation intensity from an ultra-high-frequency or micro-wave radiator.

Heretofore in determining the radiation pattern or intensity from a source of ultra-high or micro-wave frequency, considerable difficulty has been encountered by reason of the ambiguities introduced by accidental or uncontrollable reflections from walls or other reflecting objects in the path of the radiation. Furthermore at these higher frequencies difficulties are encountered with the conventional detector and indicating meters because of the complexity of the meter construction required for the purpose of measurement. When the source is connected to the indicating meter by wave guides, further voltage and current ambiguities are introduced that cannot be accurately defined. Accordingly, it is another principal object of this invention to provide a method of indicating and measuring ultra-high-frequency radiation fields by employing a special translating member for translating the radiation into thermoelectric E. M. F's which can be suitably amplified and applied to a conventional indicating meter.

Another object of the invention is to provide apparatus for converting an ultra-high-frequency radiation field into a visible indication, the apparatus employing an intercepting screen in the form of a conductive sheet in conjunction with a multiplicity of thermocouples which are mounted in heat transfer relation with the sheet but electrically insulated therefrom. These thermocouples are preferably mounted in coordinate rows and are connectable through a selector switch, or the like, to a suitable indicating meter.

Another object of the invention is to provide a translating device for converting an ultra-high-frequency radiation pattern into corresponding measurable electric currents and comprising a screen in the form of a conducting fabric or cloth upon which the radiation impinges, and having substantially the same radiation resistance as that of free space. The heat developed at the various regions of this cloth is converted into thermoelectric E. M. F.'s and a spaced reflecting plate is mounted adjacent the screen to increase the efficiency of the translation.

A feature of the invention relates to a radiation translating screen comprising a sheet of conductive cloth or fabric which is spaced from a conducting metal sheet by a distance approximating one-quarter wavelength of the radiation to be measured. A multiplicity of thermocouples are mounted in predetermined configuration and in heat transfer relation to the conductive fabric, and are connectable to a suitable indicator device through the intermediary of a selector switch.

Another feature of the invention relates to an arrangement for measuring the radiation intensity from an ultra-high-frequency radiator by employing a multiplicity of thermocouples arranged in coordinate or lattice-work array so as to intercept the radiation from the said source. Located between the thermocouples and the source is a sheet of conducting material such as a conductive cloth, and located in back of the cloth sheet is a metal plate to form with the sheet a multiplicity of short-circuited quarter-wave transmission lines for reflecting the radiated energy back to the cloth.

A further feature relates to a novel arrangement for producing a complete visual indication of the radiation pattern from an ultra-high or micro-wave frequency source.

Other features and advantages not particularly enumerated will be apparent after consideration of the following detailed descriptions and the appended claims.

Figure 1:
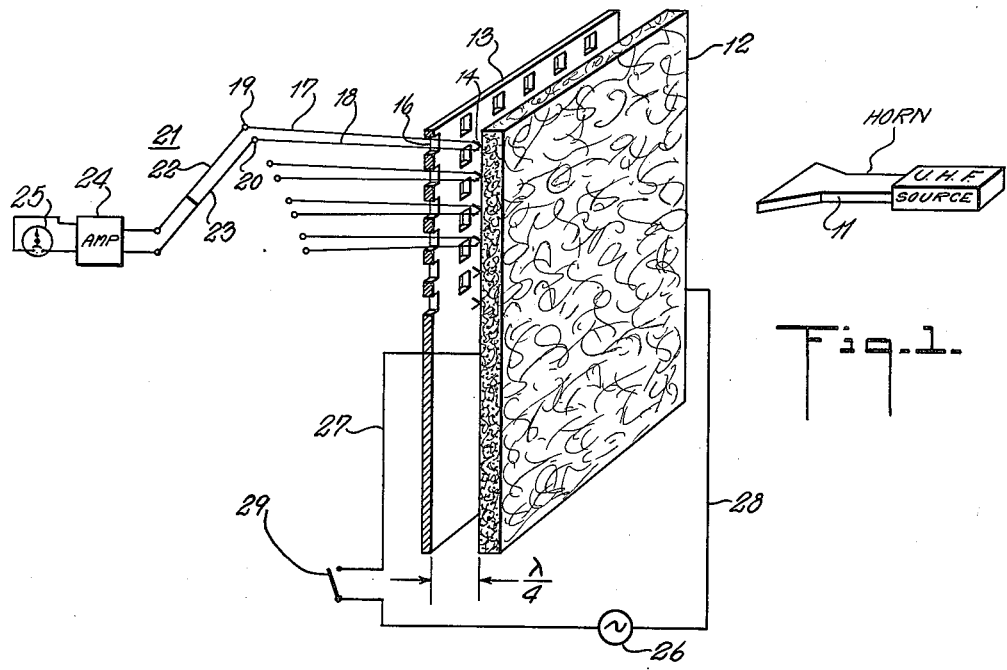
Fig. 1 is a composite schematic wiring and structural diagram, partly in perspective, of an arrangement according to the invention.

Referring to Fig. 1, there is represented by the block 10 any well-known source of ultra-high or micro-wave frequency which is connected to a suitable radiator, such for example as the electromagnetic horn 11 whose radiation field pattern is to be determined or measured. It will be understood that the invention is not limited to any particular micro-wave source or radiator, but is applicable to the measurement of ultra-high frequency waves or micro-wave patterns or intensities generally.

Located at the region where the field pattern is to be determined is a screen 12 of specially prepared composition so that it has substantially the same radiation resistance as free space. Thus the screen 12 may take the form of a woven fabric or cloth which is treated or impregnated with a conductive filler, such for example as powdered graphite or carbon, so that its radiation resistance when subjected to the radiation from radiator 11, is substantially the same as the equivalent radiation resistance of free space. For a detailed description of such a fabric and method of predetermining its radiation resistance, reference may be had to "Fields and Waves in Modern Radio" by Ramo and Whinnery, page 277, paragraph 7.20.

Fastened in spaced relation in the rear of screen 12 is a metal plate 13 of aluminum or some other high conductivity metal, the spacing between members 12 and 13 being one-quarter of the wavelength of the waves from source 10. The members 12 and 13 therefore act together as a short-circuited quarter-wavelength transmission line so that any ultra-high-frequency energy which passes the screen 12 is reflected back by sheet 13. The incident and reflected energies are therefore transformed into heat energy in the fabric 12.

Figure 2:
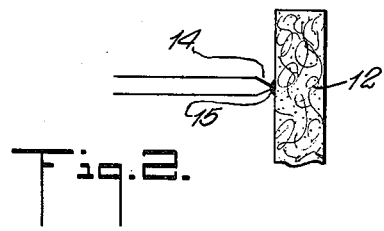
Fig. 2 is a magnified view of part of Fig. 1.

Mounted adjacent the rear face of screen 12 in close heat transfer relation thereto, is a bank of small thermo-couples 14. If desired, and as shown in magnified form in Fig. 2, the hot junction of each thermocouple may be fastened to the screen 12 by a small quantity of any suitable cement 15 which has a high seat conductivity but is effectively an electrical insulator. Any other convenient manner of insulatingly attaching the thermocouples to screen 12 may be employed, for example by stitching or clamping. If desired, the thermocouples may be insulatingly supported in suitable apertures 16 in the plate 13 and adjusted so that their hot junctions are closely adjacent to, but in slightly spaced relation from, the surface of screen 12. Preferably the thermocouples are arranged in coordinate rows to form a lattice-work, there being a sufficient number of thermocouples so as to define adequately the field pattern of the radiation incident on screen 12. In the well-known manner the cold junctions of these thermocouples can be maintained at any desired reference temperature so as to compensate for any ambient temperature changes in the vicinity of screen 12.

Each of the thermocouples is connected by respective conductors 17, 18 to the corresponding pairs of bank or fixed contacts 19, 20 of a rotary switch 21 whose rotary contact arms 22, 23, can by rotation, be connected to any desired thermocouple, and these contact arms are connected to any well-known amplifier 24, whose output can be connected to a suitable indicating meter 25. Thus by rotating the switch 21, the intensity of the radiation at any desired point on screen 12 can be accurately measured and by applying the measured values for the various points on a suitably-graduated blank, the intensity and shape of the field pattern can be accurately determined.

If it is desired to calibrate the system, direct current or a sixty-cycle alternating current from source 26 can be connected in circuit with the screen 12 by means of conductors 27, 28, and the normally-open switch 29, which is connected to the meter 25. By suitable adjustment of the current from source 26, the meter 25 may be calibrated directly in units corresponding to units of radiation intensity.

Figure 3:
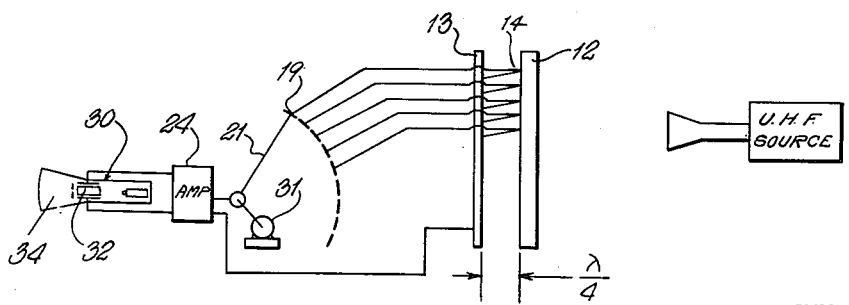
Fig. 3 is a modification of the arrangement of Fig. 1.

If it is desired to produce an instantaneous visual indication of the field pattern, the indicator 25 can be replaced by a cathode ray tube oscilloscope 30 and the switch 21 can be rotated so as to connect in circuit successively each and every one of the thermocouples at a rate within the persistency of normal vision. Thus as shown in Fig. 3, the switch arm 21 can be connected to a suitable motor 31 which rotates the arm 21 so as to completely traverse all the contacts 19 within one-sixteenth of a second or less. The output of amplifier 24 may then be connected to one of the coordinate deflector elements, such for example as the horizontal deflector plates 32, the other deflector elements such as the vertical deflector plates being energized by a suitable deflecting voltage in timed relation with the rate of rotation of switch arm 21. The oscillograph trace on the screen of tube 30 will therefore be a direct indication of the intensity and orientation of the various points in the radiation field from the horn 11.

While the drawing shows a horn-type radiator, it will be understood that the invention is not limited thereto and is capable of use in determining the directional pattern of any other well-known type of radiator.

Various changes and modifications may be made herein without departing from the spirit and scope of the invention.

What is claimed is:

1. Apparatus for determining the pattern of an ultra-high-frequency radiation field, comprising, a sheet of conductive material for intercepting the radiation while having substantially negligible reflecting powers for the radiation, thermoelectric means mounted adjacent said sheet, an indicating device controlled by the said thermoelectric means, and another sheet of conductive material mounted in spaced relation to the rear of said first sheet and at a distance therefrom approximately one-quarter wavelength of the radiation to be determined.

2. Apparatus for indicating the pattern of an ultra-high-frequency radiation field, comprising a screen of conductive material for converting the radiation into heat, thermoelectric means adjacent said screen, a wave reflecting member spaced from the rear of said screen a distance of approximately one-quarter the wavelength of the radiation to form therewith an equivalent one-quarter wavelength short-circuited transmission line, and an indicator device connectable in circuit with said thermoelectric means.

3. Apparatus for determining the radiation pattern of an ultra-high-frequency field, comprising, a screen of conductive fabric upon which the radiation impinges, a plurality of thermocouples mounted in lattice-like array adjacent said screen, an indicator device, and another screen of conductive material mounted in spaced relation to the rear of the first-mentioned screen and at a distance therefrom of approximately one-quarter wavelength of the radiation to be determined and switch means for successively connecting each of said thermocouples in circuit with said device.

4. Apparatus for determining the radiation pattern of an ultra-high-frequency field, comprising, a screen of conductive fabric upon which the radiation impinges said screen having substantially the same radiation resistance as free space, a bank of thermocouples mounted in coordinate array adjacent said screen, each of said thermocouples being in heat transfer with the screen but electrically insulated therefrom, a conductive metal plate mounted in spaced relation to the rear of said screen to form therewith an effective short-circuited quarter-wavelength transmission line, a multi-point switch having a contact arm, the points of said switch being connected respectively to said thermocouples, and an indicating device connected to said contact arm.

5. Apparatus for determining the radiation pattern of an ultra-high-frequency field, comprising a screen of conductive fabric upon which the radiation impinges said screen having substantially the same radiation resistance as free space, a bank of thermocouples mounted in coordinate array adjacent said screen, each of said thermocouples being in heat transfer with the screen but electrically insulated therefrom, a conductive metal plate mounted in spaced relation to the rear of said screen to form therewith an effective short-circuited quarter-wavelength transmission line, a multi-point switch having a rotatable contact arm, the points of said switch being connected respectively to said thermocouples, and an indicating device of the cathode ray tube type, said cathode ray tube having one of its deflector systems energized in timed relation with the rotation of the said rotatable contact arm, and the other deflecting system energized in accordance with the successive voltages from said thermocouples.

WINFIELD W. SALISBURY.

REFERENCES CITED

The following references are of record in the file of this patent:

UNITED STATES PATENTS

| Number | Name | Date |
|---|---|---|
| 2,000,806 | White | May 7, 1935 |
| 2,293,839 | Linder | Aug. 25, 1942 |
| 2,306,272 | Levy | Dec. 22, 1942 |
| 2,366,355 | Roberts | Jan. 2, 1945 |
| 2,412,562 | Crawshaw | Dec. 17, 1946 |
| 2,429,200 | Bradley et al. | Oct. 21, 1947 |
| 2,430,664 | Bradley | Nov. 11, 1947 |
| 2,435,597 | Moullin | Feb. 10, 1948 |

OTHER REFERENCES

Electromagnetic Waves, Schelkunoff, 1943, pages 82 and 83.